(No Model.)

I. W. McGAFFEY.
RAILWAY VELOCIPEDE.

No. 286,623. Patented Oct. 16, 1883.

Witnesses:
J. Everett Brown
A. W. Munday.

Inventor:
Ives W. McGaffey,
per Munday, Evarts & Adcock,
his Attorneys.

UNITED STATES PATENT OFFICE.

IVES W. McGAFFEY, OF CHICAGO, ILLINOIS, ASSIGNOR TO EVERETT B. PRESTON, OF SAME PLACE.

RAILWAY-VELOCIPEDE.

SPECIFICATION forming part of Letters Patent No. 286,623, dated October 16, 1883.

Application filed March 7, 1883. (No model.)

*To all whom it may concern:*

Be it known that I, IVES W. McGAFFEY, a citizen of the United States, residing in Chicago, in the county of Cook and State of Illinois, have invented a new and useful Improvement in Railway - Velocipedes, of which the following is a specification.

The present invention relates to certain improvements in railway-velocipedes, the nature of which will be understood from the accompanying drawings, forming a part of this specification, and the subjoined description thereof.

Figure 1:
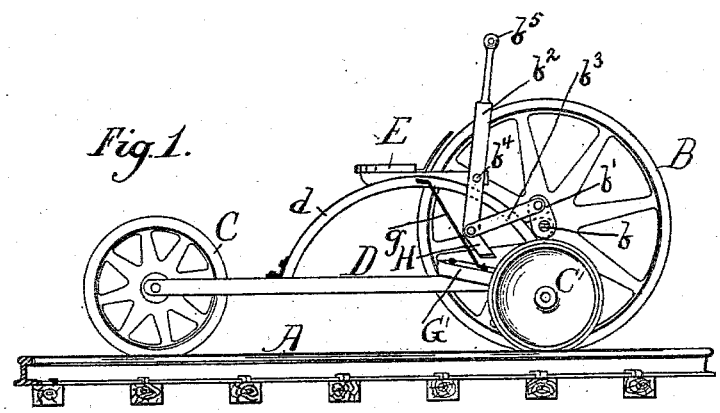
Figure 2:
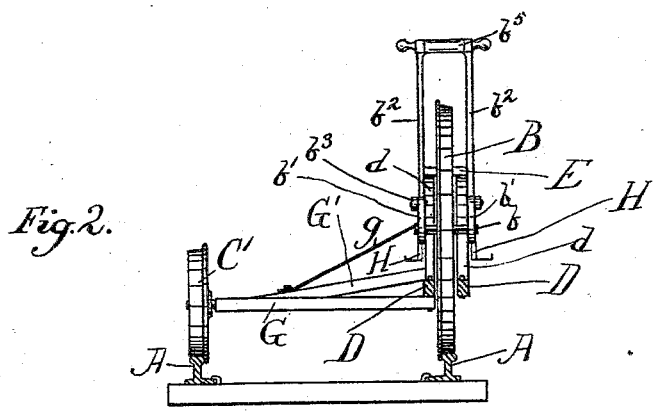

In the drawings, Figure 1 is a side view of a device embodying my invention, and Fig. 2 is an end view of the same.

In said drawings similar letters of reference indicate like parts wherever the same are used.

In the drawings, A represents the railway-track upon which the vehicle is adapted to run.

My improved velocipede has three wheels, provided with flanges to fit the rails of the track, one large driving-wheel, B, and two smaller wheels, C and C', one of which, C, follows the wheel B, and the other runs upon the opposite rail. The frame consists of a pair of horizontal parallel bars, D D, between which the wheels B and C are mounted. The seat E is secured to a pair of curved braces, $d\,d$, the ends of which are secured upon the parallel bars D D. The wheel C is journaled at one end of the bars D D, and the crank-shaft or axis $b$ of the large wheel B is journaled in suitable bearings secured to the curved braces $d\,d$. The wheel C' is journaled upon the end of the transverse bar or axle G, which is secured at one end to the bars D D, and is braced by means of the diagonal bar G'. A brace-rod, $g$, also extends from the transverse bar or axle G to the upper part of one of the curved braces $d\,d$. The cranks $b'$, one on each end of the crank-shaft $b$, are operated by a double lever, $b^2$, and connecting-bars $b^3$, the lever $b^2$ being pivoted to the frame at $b^4$. The double lever $b^2$ is provided with a handle, $b^5$, at its top.

The frame and the wheels B and C, excepting the tires thereof, are preferably made of wood, so as to be of as light construction as possible; but the wheel C, which runs on the opposite rail, is preferably made of iron, so that its weight may assist in balancing the vehicle, and cause it to run steadily.

In addition to the lever to be operated by the rider's hands, I provide also a pair of stirrups, H, connected with the crank-shaft, as rests for his feet, by means of which alone the vehicle may be propelled, or by which it may be propelled in connection with the hand-lever operated jointly therewith. In this way it will be seen I am enabled to produce a railway-velocipede of very cheap and simple construction.

In operation, the operator, seated upon the machine, with his feet resting upon the bars D, propels the vehicle by operating the lever $b^2$, which is immediately in front of him. It will be observed that the cranks $b'$ and connecting-bars $b^3$ and the branches of the double lever $b^2$ fit astride or outside of the curved braces $d\,d$.

I claim—

1. In a railway - velocipede, the combination of drive-wheel B, wheels C and C', frame-pieces D D, curved bars $d\,d$, transverse bars G, diagonal brace G', crank-shaft $b$, cranks $b'$, connecting-bars $b^3$, lever $b^2$, and seat E, all arranged and operating substantially as specified.

2. The frame of a railway-velocipede, herein shown, consisting of the parallel bars carrying the journal of the wheel C, the curved braces mounted upon said parallel bars, and supporting the shaft of the drive-wheel and the operator's seat, the transverse bar, and the diagonal bar, all combined and arranged substantially as specified.

Chicago, February 28, 1883.

IVES W. McGAFFEY.

Witnesses:
H. M. MUNDAY,
T. EVERETT BROWN.